June 3, 1969 M. B. CARLBOM 3,447,635
ELEVATING PLATFORM

Filed Oct. 12, 1967 Sheet 1 of 5

INVENTOR.
MARSHALL B. CARLBOM

BY *Anslander & Thomas*

ATTORNEYS

June 3, 1969  M. B. CARLBOM  3,447,635
ELEVATING PLATFORM
Filed Oct. 12, 1967

INVENTOR.
MARSHALL B. CARLBOM
BY
ATTORNEYS

United States Patent Office 3,447,635
Patented June 3, 1969

3,447,635
ELEVATING PLATFORM
Marshall B. Carlbom, New York, N.Y., assignor of fifty percent to Leonard Rapaport, Bronx, N.Y., and Murray Blumberg, Mount Vernon, N.Y., and fifty percent to Elescope Corporation, New York, N.Y., a corporation of New York
Filed Oct. 12, 1967, Ser. No. 674,933
Int. Cl. E04g 1/18, 1/22; B66f 3/22
U.S. Cl. 182—141       10 Claims

ABSTRACT OF THE DISCLOSURE

The present invention provides an elevating platform, extensible and retractable and adapted to lie substantially flat on its base when in collapsed position. The pivotal interconnection between the legs of the structural members is provided at a point offset from the longitudinal axis running from the end connecting points of the structural members wherein a nesting of the structural members results when the platform is in collapsed position. The present invention further provides for the movement of both pairs of base legs of the pivotally interconnected structural members to move towards each other during extension of the platform thereby centralizing the support for the platform both at its base and at the underside of the platform enabling greater balance.

---

The present invention relates to an elevating platform.

In order to provide access to heights above ground level either to deliver or receive a load, or to act as a work station, various elevating devices have been employed. Various devices such as scaffolding and the like are in use as work station platforms and devices such as fork lifts and the like have been employed for load delivery purposes. However, devices such as these have inherent limitations as to their area of use and in their height capabilities.

In order to overcome the foregoing and to answer the need for a simple portable hoist, various raised or elevated platform devices have been developed. These structures generally provide a base and platform, with the platform mounted to the base by a lazy tong-type arrangement and to provide for a sissor-like action to move the platform towards or away from the base.

While devices such as these have met with some success they are limited in use primarily due to two factors. One method of construction of lazy-tong arrangements of the past provided for the anchoring of one of the legs to the base of the device and elevation was affected by the movement of the other leg horizontally towards the anchored leg. A similar method of affixation was affected to the underside of the platform. As the platform was lifted, the anchored leg remained stationary and the movable legs moved toward it and in extended position the legs on the base and on the underside of the platform were relatively closely spaced apart and offset towards one side of the base and platform. The primary support for the platform was off center and a weight limitation was presented. If sufficient weight were placed on the unsupported side of the platform there was a danger of tipping. To overcome this problem the base had to be enlarged and in view of this size limitation, devices of this nature were limited as to height and load.

An even more limiting factor has been the number of scissor-like extensions which could heretofore be employed. In most instances one or two vertical pairs of scissor-like extensions have been employed. Where more than two have been attempted in use, the collapsed structure, due to the multiplicity of extensions which stacked one above the other left the platform substantially high above the base and the ground and the loading onto the platform itself became a problem of overcoming relatively substantial heights.

As a result of the foregoing lazy-tong like lifting structures have been limited to use for relatively low heights and with relatively small loads.

According to the present invention there is provided an elevating platform with great extensibility and adapted to lie substantially flat on its base when in collapsed position. By providing for the pivotal interconnection between the legs of the structural members at a point offset from the longitudinal axis running from the end connecting points of the structural members a nesting of the structural members results when the platform is in collapsed position. The positioning of the central pivotal points away from the point of crossing of the legs further allows for an interlock in collapsed position and the height increase of the stacked structural members is substantially centralized at a point when the platform is in collapsed position. By centralizing the major portion of the height increase of the stacked structural members a single well for each stack may be provided on the underside of the platform to accept therein the central pivotal interconnections of the members so that the platform in collapsed position lies substantially flat on the base.

The present invention further provides for the movement of both pairs of base legs towards each other during extension of the platform thereby centralizing the support for the platform both at its base and at the underside of the platform enabling greater balance without the need to enlarge the base support.

The resultant structure provides an elevating platform able to be extended to substantial heights, collapsible to a substantially flat, relatively low height and able to support substantial weights.

Although such novel feature or features believed to be characteristic of the invention are pointed out in the claims, the invention and the manner in which it may be carried out may be further understood by reference to the description following and the accompanying drawings.

Referring now to the figures in greater detail, where like reference numbers denote like parts in the various figures.

Figure 1:
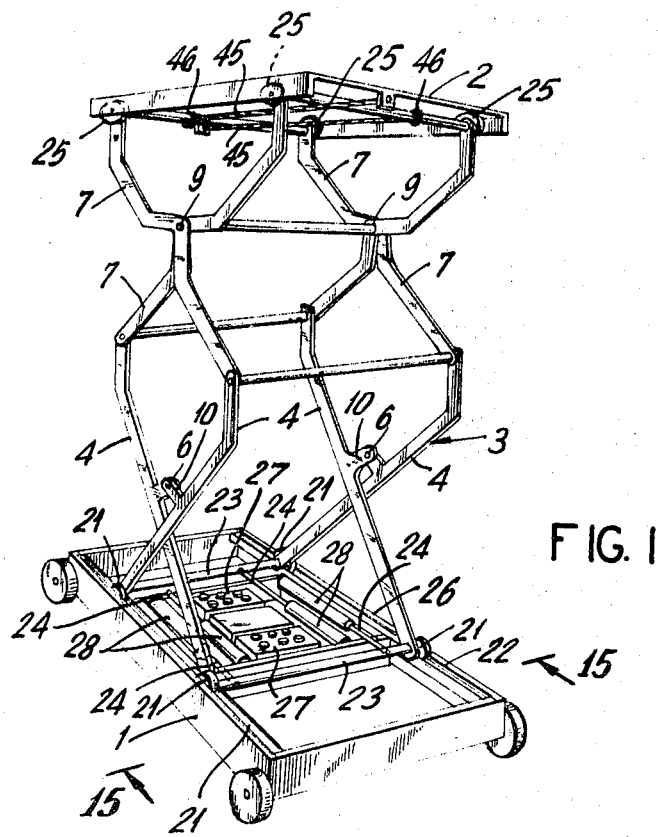
FIG. 1 is a perspective view of an elevating platform of the present invention.

As shown in FIG. 1, the elevating platform of the present invention generally comprises a base 1 and platform 2 interconnected by structural members 3 which act in a scissor-like manner to raise and lower the platform 2 away from and towards the base 1.

Figure 2:
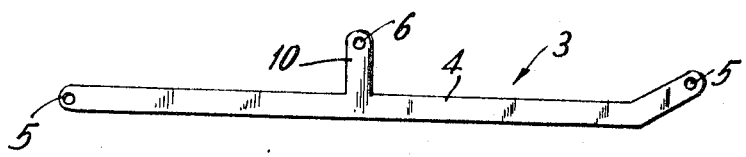
FIG. 2 is a front elevation of a structural element employable with the present invention.
Figure 3:
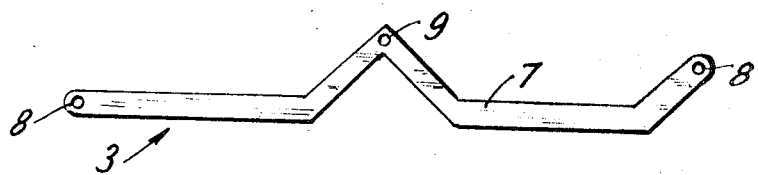
FIG. 3 is a front elevation of another structural element employable with the present invention.

The structural members 3 as shown in FIG. 1 are shown in detail in FIGS. 2 and 3. Referring to FIGS. 1, 2 and 3, the lower structural members 3 are pairs of legs 4 such as shown in FIG. 2 generally comprising an elongated member having connection points 5 at the ends thereof and a somewhat centrally disposed pivot point 6 offset from the longitudinal axis of the leg 4. While as shown in FIG. 2 one of the connecting points 5 is curved upward, the leg 4 may be substantially straight, the curvature as shown being designed to facilitate assembly as hereinafter more fully explained.

The upper structural members 3 as shown in FIG. 3 comprise pairs of legs 7 also having connection points 8 at the ends thereof and a somewhat centrally disposed pivot point 9 offset from the longitudinal axis of the leg 4. As in FIG. 2, the connecting ends of the leg 7 is provided with a curvature for ready assembly, however it should be noted, that as with the legs 4 of FIG. 2, such curvature is not requisite to proper functioning.

The offset of the pivot point 6 in FIG. 2 is accomplished by employing a vertical arm on the leg 4. As shown in FIG. 3 the offset of the pivot point 9 is provided by a lambda shaped configuration on the leg 7. It is preferable that the lambda be of sufficient height so that the length of the vertical arm 10 is adapted to fit therein.

Figure 4:
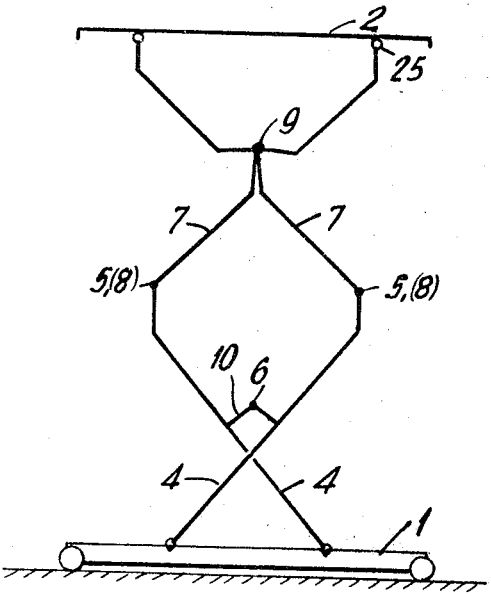
FIGS. 4–6 are schematic views of the sequential collapse of the platform of FIG. 1.
Figure 5:
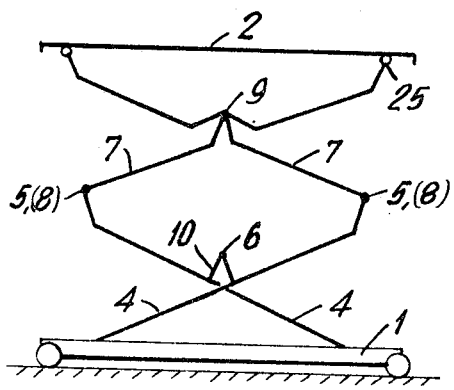
Figure 6:
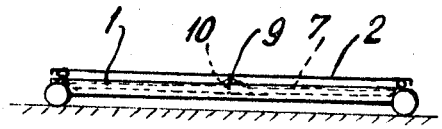

Referring to FIGS. 4–6 the interaction of the legs 4, 7 can be seen. The legs 4, slideably mounted to the base 1 extend angularly upward and cross. In lieu of affixation at the point of crossing, the pivotal interconnection as between the legs 4 is made through pivot points 6 thereby positioning the pivotal interconnection inboard of the base and offset with respect to the longitudinal axis of the legs 4. The upper ends of the legs 4 are pivotally interconnected through connection points 5 to connection points 8 of the upper legs 7. The upper legs 7 extend angularly upward and cross the pivotal affixation as between the upper legs 7 is made through the pivot points 9, which as heretofore explained are also offset with respect to the longitudinal axis of the upper legs 7. The upper ends of the legs 7 are slideably mounted to the underside of the platform 2.

Figure 7:
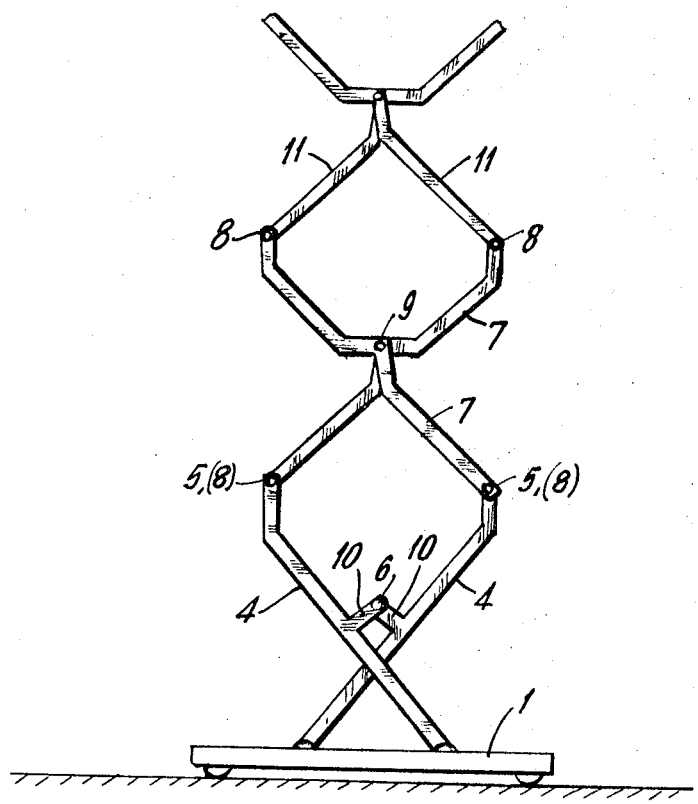
FIG. 7 is a schematic view of another embodiment of an elevating platform of the present invention.

As the platform 2 is lowered the legs 4, 7 act in a scissor-like manner with the upper ends of the legs 7 and the lower ends of the legs 4 moving further apart. As shown in FIG. 6 in collapsed position, the legs 4, 7 lie inboard of the base 1 and the upper legs 7 nest over the lower legs 4 with the vertical arm 10 of the lower 4 nested within the lambda configuration of the upper arms 7. The nesting provided by the offsetting of the pivotal interconnection of the structural members substantially lessens the height of the collapsed stack of legs, and as shown in FIG. 7 further pairs of legs 11 may be provided, preferably of the type shown in FIG. 3 which when collapsed will nest and overlay the prior pair of legs.

While it is preferably for structural strength that the lowest pairs of legs be of the type shown in FIG. 2 having the vertical arm 10 support for the offset pivot point 6 various other combinations such as those shown by way of example in FIGS. 8–11 are readily employable.

Figure 8:
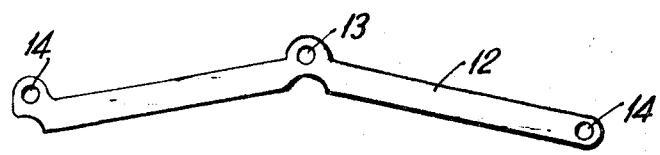
FIGS. 8–11 are front elevations of other structural element embodiments of the present invention.
Figure 9:
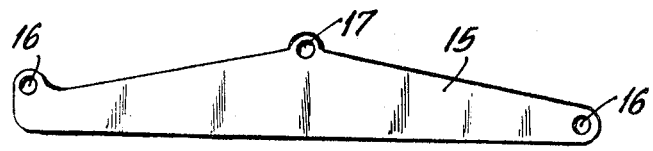

As shown in FIGS. 8 and 9 structural members may all be constructed to be in the shape of an elongated lambda such as the leg 12 of FIG. 8 wherein the central pivot point 13 is offset with respect to the longitudinal axis drawn between the ends 14 of the leg 12. As with the embodiments hereinbefore described, in collapsed position, each succeeding pair of structural members will be progressively inboard and adapted to overlay and nest within the structural members positioned thereunder. Where greater structural strength for lifting is desired the lowest pair of structural members employed with the legs 12 of FIG. 8 may be a solid triangular configuration such as legs 15 of FIG. 9 which also has its central pivot point 17 offset from the longitudinal axis running between the ends 16 of the leg 15.

Figure 10:
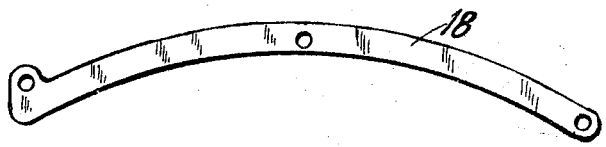
Figure 11:
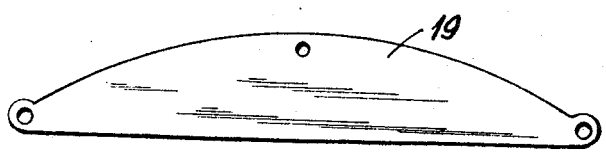
Figure 12:
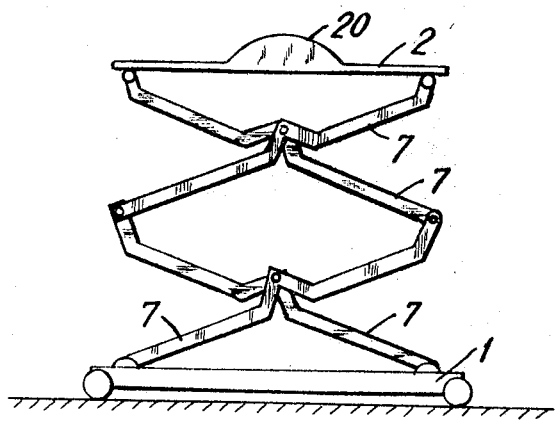
FIG. 12 is a schematic view of another embodiment of the present invention.

As shown in FIGS. 10 and 11 the same result may be accomplished by having all or at least all of the upper structural members of a curved configuration such as the leg 18. If additional reinforcement is desired, the lowest structural members may be a solid curved member such as the leg 19 of FIG. 11. FIG. 12 illustrates an elevating platform where all of the structural support members are legs 7 such as shown in FIG. 3.

Figure 13:
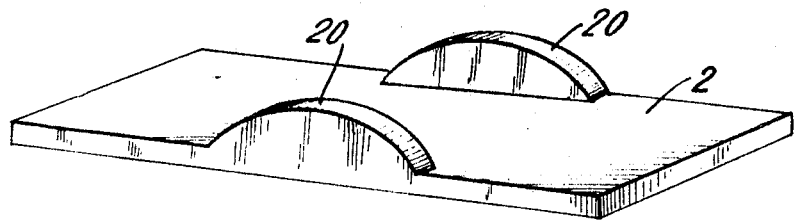
FIG. 13 is a perspective view of a platform of the present invention.
Figure 14:
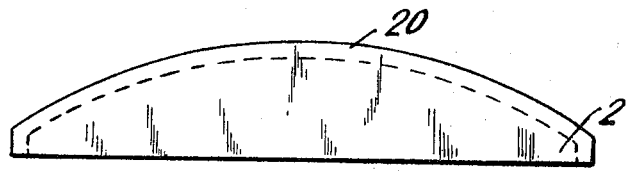
FIG. 14 is a side elevation of another platform embodiment of the present invention.

While the elevating platform of the present invention having the central pivot point of the structural members offset with respect to a longitudinal axis drawn through the ends of the structural members substantially reduces the distance between the platform 2 and the base 1 when collapsed (as much as 4 times as compared with some of the prior lazy-tong arrangements of the prior art) an even greater spacial savings is afforded when the platform 2, such as shown in FIGS. 12–14 is provided with a well 20 adapted to receive therein the raised central portion of the collapsed stacked structural members.

Due to the offset positioning of the pivotal connection between the structural members as hereinbefore described, in lieu of the stacked overlay found in the prior art, the structural members of the present invention nest with the pivot point connection being the point of highest upward protrusion in collapsed position. By providing a well 20 on the platform 2 adapted to receive therein the upwardly protruding pivotal connection points, the platform may be lowered to a substantial juxtaposition to the base 1.

As most clearly shown in FIG. 13 the wells 20 do not substantially decrease the useable platform area since the wells 20 need only be of sufficient width to accept the structural members therein. As shown in FIG. 14, where the structural members are such as those shown in FIGS. 8–11, the well 20 may extend along a substantial portion of the upper side edges of the platform 2.

While the structural members of the present invention are readily adaptable for use with existing base and platform configurations, as shown in FIGS. 1 and 15–17 greater support and strength may be provided, especially in view of the greater economic height capabilities of the supporting members by use of a substantially centrally disposed positioning of the support members on both the base 1 and the underside of the platform 2.

Figure 15:
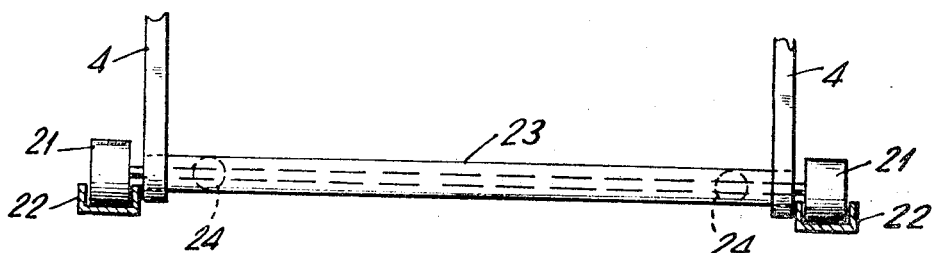
FIG. 15 is a sectional view taken along lines 15–15 of FIG. 1.

As shown in FIGS. 1 and 15 the lower legs 4 are slideably mounted on the base 1. Wheels 21 or casters at the base of the legs 4 ride within a channel 22 running horizontally along the longitudinal inner sides of the base 1. Each of the pairs of parallelly aligned legs 4 are connected by a transverse member 23. The lifting apparatus is preferably mounted between the transverse members 23 and is adapted to force the transverse members either together or apart depending upon whether or not the platform is to be raised or lowered.

FIGS. 1 and 15 illustrate a hydraulic arrangement employing push-pull sets of hydraulic rams 24 preferably a set of oppositely disposed rams 24 on each longitudinal side of base 1. The upper ends of the upper legs 7 are slideably affixed to the underside of the platform 2, such as by wheels 25 or casters mounted with longitudinally extending channels (not shown) on the underside of the platform 2 so as to have the elevating platform arrangement of the present invention serve as an integral unit. A housing 26 may be provided in the base 1 to carry the power supplies such as batteries 27 and the hydraulic pump mechanism 28.

Upon actuation, the hydraulic rams 24 in extended position contract moving the legs 4 closer together and raise the platform 2. Upon extension the rams 24 force the legs 4 apart and lower the platform 2.

The curvatures shown in FIGS. 2 and 3 on the ends of the legs 4, 7 facilitate the positioning and affixation of the wheels 21, 25 and the interconnection between the lower legs 4 and the upper legs 7.

Figure 16:
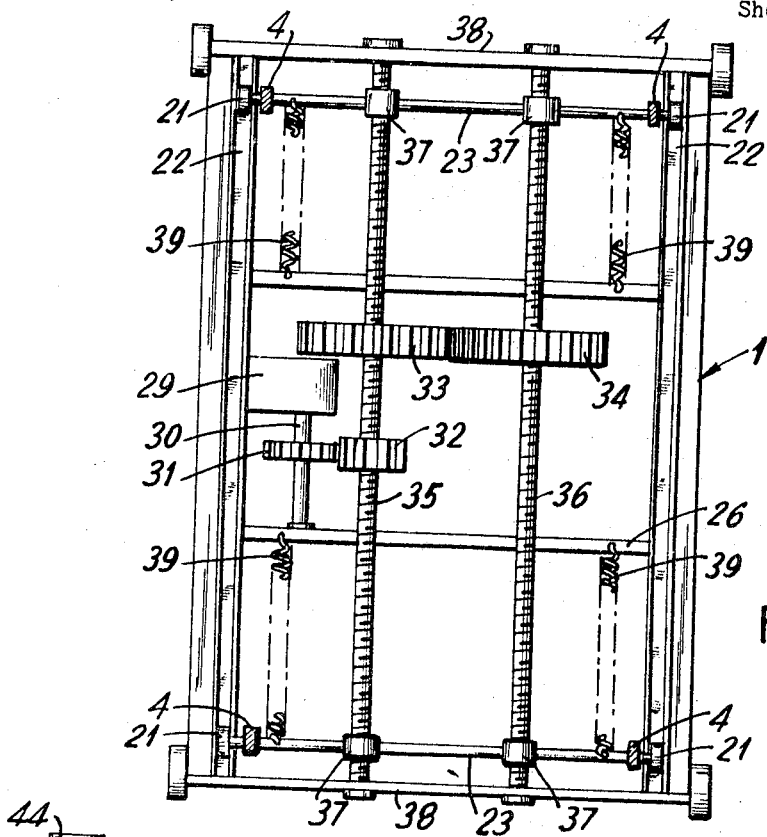
FIG. 16 is a top elevation of alternate lifting means of the present invention.

As shown in FIG. 16 a screw drive may be employed wherein a motor drives a shaft 30 and gear 31 to rotation.

The gear 31 in turn drives a gear 32 which causes rotation of the screw shaft 35. A gear linkage 33, 34 between the rotating screw shaft 35 drives a second parallel aligned screw shaft 36 to rotation. Both ends of each screw shaft 35, 36 pass through the housing 26, a lead or acme nut mounting on the transverse members 23 and are fixedly mounted to the transverse side frame members 38 of the base 1. Upon rotation the screw shafts 35, 36 force the nuts 37 either closer together or further apart, depending upon the direction rotated bringing the transverse members 23 with the legs 4 carried thereon closer or further apart. Springs 39 may be employed to add to the force needed for lift providing a measure of free lift to the platform 2.

Figure 17:
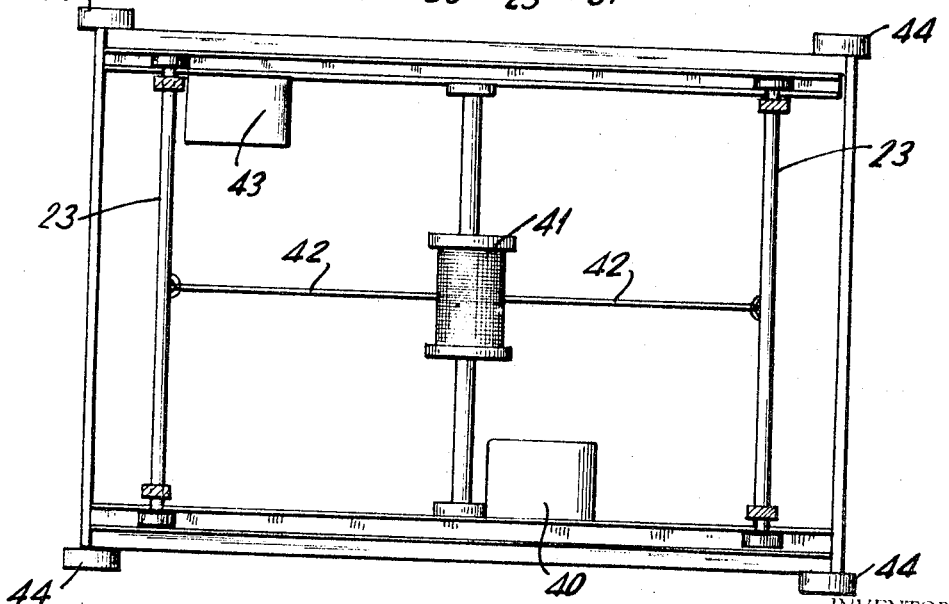
FIG. 17 is a top elevation of alternate lifting means of the present invention.

FIG. 17 employs a cable lift wherein a motor drives a drum 41 to rotation, the rotating drum acting to wind cable 42 linked to the transverse members 23 to bring the transverse member 23 closer together and thereby lift the platform. The platform is gravity returned to its collapsed position upon reversal of the drum 41, slackening the cable 42.

It is preferable that the elevating platform be mobile and a motor 43 may be employed to drive a set of wheels 44 with steering readily affected from the platform for example by use of a tiller or steering wheel mounted on a telescoping shaft (not shown) to the other set of wheels by means known in the art.

In operation when the structural members are actuated to raise the platform 2 from the base 1 both parallel sets of bottom legs 4 and upper legs 7 move inward towards each other and maintain a substantially centralized support position on the base 1 and beneath the platform 2. In this manner a more even weight distribution is provided and the lopsided support heretofore found is eliminated.

Various supplemental devices may be employed to maintain the platform 2 and prevent the platform 2 from undesired horizontal movement. For example, springs (not shown) such as helically wound coil springs may be affixed to the axle between a pair of wheels 25 on the underside of the platform, with the other end of the spring anchored to the transverse underside member of the platform 2 on the end of the platform 2 furthest opposed from the said axle. A pair of these springs may be employed, one on each axle. Or, as shown in FIG. 1 a cable 45 may be affixed to each of the cross members or axles which interconnect the pair of wheels 25 on the underside of the platform 2, with each of the cables 45 threaded about a pulley 46 mounted to the transverse end portion furthest opposed from the axle on the underside of the platform 2. Means (not shown) such as a roller drum take up and pay out mechanism maintains an even tension on both of the cables 45 during extension and collapsing of the platform 2. By selectively tensioning the cables, horizontal movement of the platform may be effected, where such movement is desired.

Where, such as shown in FIGS. 1–3 the lower legs are of the type employing the vertical arm 10 to offset the central pivot point and upper legs 7 are of the lambda configuration, the angle of inclination for the lower legs 4 during elevation is greater for a vertical distance than those of the upper legs 7, thereby providing a wider support for the underside of the platform 2 since the upper legs 7 do not move inwards towards each other a substantial distance during elevation.

The terms and expressions which are employed are used as terms of description; it is recognized, though that various modifications are possible within the scope of the invention claimed.

Having thus described certain forms of the invention in some detail, what is claimed is:

1. An elevating platform device comprising a platform member, a base member, a first pair of structural members interposed in pivotal cross relationship between said platform and base members, at least one additional pair of structural members mounted in pivotal cross relationship and pivotally interconnected in vertical relationship to said first pair of structural members, means connecting said platform and base members to said structural members, said structural members adapted to move said platform and base members towards and away from each other, a central pivot mount portion on each said structural member having a point thereon offset from a longitudinal axis running between the end portions of each said structural member, the central pivotal interconnection between each pair of said structural members effected through said offset portion, the respective pivotal interconnections of each said structural member pairs adapted to be juxtaposed to a nesting relationship when said elevating platform is in collapsed position, and means to actuate said structural members to move said platform member an optional distance from said base member.

2. The elevating platform as claimed in claim 1 further including a second pair of said structural members mounted in pivotal cross relationship, in parallel, spaced apart relationship to the first pair of structural members.

3. The elevating platform as claimed in claim 1 wherein said platform further includes a well on the underside thereof adapted to accept therein said central pivot mount portions of said structural members when said elevating platform is in collapsed position.

4. The elevating platform as claimed in claim 1 further including a plurality of additional pairs of structural members mounted in pivotal cross relationship and pivotally interconnected in ascending vertical relationship to said additional pair of structural members, each of said structural members including a central pivot mount portion and each said additional pair of structural members pivotally interconnected, the central pivotal interconnection between the structural members in each pair offset with respect to a longitudinal axis running between the end portions of each structural member of said pair.

5. The elevating platform as claimed in claim 4 wherein said central pivot mount portion of said first pair of structural members includes a centrally located vertical arm and said pivotal interconnection of said first pair of structural members is made through said vertical arms and further including a lambda shaped central mount portion on each of said additional pairs of structural members.

6. The elevating platform as claimed in claim 1 wherein said central pivot mount portion is lambda shaped having said pivot point located at the apex of said lambda.

7. The elevating platform as claimed in claim 1 wherein said actuating means include hydraulic rams adapted to move oppositely disposed structural members toward and away from each other.

8. The elevating platform as claimed in claim 1 wherein said actuating means include screw driven means adapted to move oppositely disposed structural members towards and away from each other.

9. The elevating platform as claimed in claim 1 wherein said actuating means include a flexible linking means affixed to oppositely disposed structural members and rotating means adapted to take up said linking means to move said oppositely disposed structural members towards each other.

10. The elevating platform as claimed in claim 1 wherein said connecting means include; guide means on said base; guide means on the underside of said platform and slide means on the respective ends of said structural members in juxtaposition to said base member and said platform member.

(References on following page)

References Cited

UNITED STATES PATENTS

| | | | |
|---|---|---|---|
| 539,672 | 5/1895 | Decker | 182—141 |
| 3,110,476 | 11/1963 | Farris | 182—141 |
| 3,160,228 | 12/1964 | Steed | 182—148 |
| 3,356,181 | 12/1967 | Cranger | 182—141 |

FOREIGN PATENTS 686,615   1/1940   Germany.

REINALDO P. MACHADO, *Primary Examiner.*

U.S. Cl. X.R.

254—122